(12) United States Patent
Sellinger et al.

(10) Patent No.: US 10,371,097 B2
(45) Date of Patent: Aug. 6, 2019

(54) NON-NEWTONIAN MATERIALS IN AIRCRAFT ENGINE AIRFOILS

(71) Applicant: General Electric Company, Schenectady, NY (US)

(72) Inventors: Aaron Todd Sellinger, Cincinnati, OH (US); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 394 days.

(21) Appl. No.: 15/203,927

(22) Filed: Jul. 7, 2016

(65) Prior Publication Data

US 2018/0010614 A1  Jan. 11, 2018

(51) Int. Cl.
| | |
|---|---|
| *F04D 29/38* | (2006.01) |
| *F02K 3/06* | (2006.01) |
| *F04D 29/32* | (2006.01) |
| *F01D 5/16* | (2006.01) |
| *F01D 25/04* | (2006.01) |
| *F01D 5/28* | (2006.01) |

(Continued)

(52) U.S. Cl.
CPC .................. *F02K 3/06* (2013.01); *F01D 5/16* (2013.01); *F01D 5/282* (2013.01); *F01D 25/04* (2013.01); *F04D 29/023* (2013.01); *F04D 29/324* (2013.01); *F04D 29/668* (2013.01); *F05D 2220/36* (2013.01); *F05D 2300/437* (2013.01); *F05D 2300/601* (2013.01); *F05D 2300/603* (2013.01); *F05D 2300/6012* (2013.01); *F05D 2300/614* (2013.01); *F05D 2300/615* (2013.01); *Y02T 50/672* (2013.01); *Y02T 50/673* (2013.01)

(58) Field of Classification Search
CPC .......... F04D 28/388; F01D 5/16; F01D 5/282; F01D 25/04; F01D 25/06; F05D 2260/96
See application file for complete search history.

(56) References Cited

U.S. PATENT DOCUMENTS 3,357,850 A * 12/1967 Baker ...................... F01D 5/16
                                                    188/268
3,895,595 A *  7/1975 Kelly .................... B63B 21/663
                                                    114/243

(Continued)

FOREIGN PATENT DOCUMENTS

| CA | 2598370 A1 | 3/2008 |
|---|---|---|
| EP | 1897609 A2 | 3/2008 |

(Continued)

OTHER PUBLICATIONS

Dynamics with a Non-Newtonian Gas: The Force on a Body Moving thorough a Beam of Excitation in Superfluid He-3; D.J. Cousins, published in vol. 79, No. 12 of Physical Review Letters (Year: 1997).*

(Continued)

*Primary Examiner* — Jason D Shanske
*Assistant Examiner* — Brian O Peters
(74) *Attorney, Agent, or Firm* — Dority & Manning, P.A.

(57) ABSTRACT

A component is provided for a turbine engine. The component can include an airfoil defining a surface, and an energy absorbing composite positioned on the surface of the airfoil or within the airfoil. The energy absorbing composite includes a shear thickening fluid distributed through a matrix.

17 Claims, 5 Drawing Sheets

(51) Int. Cl.
*F04D 29/02* (2006.01)
*F04D 29/66* (2006.01)

(56) References Cited

U.S. PATENT DOCUMENTS

| | | | | |
|---|---|---|---|---|
| 4,097,193 | A | * | 6/1978 | Brunsch ................ B64C 27/001 416/134 A |
| 4,895,491 | A | * | 1/1990 | Cross .................... F04D 29/388 244/123.9 |
| 5,776,839 | A | | 7/1998 | Dischler et al. |
| 7,306,828 | B2 | | 12/2007 | Barrera et al. |
| 7,498,276 | B2 | | 3/2009 | Wagner et al. |
| 8,061,997 | B2 | | 11/2011 | LeHong et al. |
| 8,091,692 | B2 | * | 1/2012 | Deshmukh .............. F16F 9/003 188/267.2 |
| 8,430,984 | B2 | | 4/2013 | Lee et al. |
| 8,499,908 | B2 | * | 8/2013 | Barker .................... D07B 5/00 188/267.2 |
| 2009/0074586 | A1 | | 3/2009 | Le Hong et al. |
| 2009/0191989 | A1 | | 7/2009 | Lammer et al. |
| 2009/0305589 | A1 | | 12/2009 | Budden et al. |
| 2011/0126508 | A1 | * | 6/2011 | Rice ...................... F01D 21/045 60/39.091 |
| 2012/0099976 | A1 | * | 4/2012 | Mickelsen ............ F01D 21/045 415/182.1 |
| 2013/0032316 | A1 | | 2/2013 | Dhiman et al. |
| 2015/0083024 | A1 | | 3/2015 | Zicker |
| 2015/0126631 | A1 | | 5/2015 | Bruno et al. |
| 2015/0335985 | A1 | | 11/2015 | Schenck et al. |
| 2018/0009201 | A1 | | 1/2018 | Sellinger et al. |
| 2018/0010614 | A1 | | 1/2018 | Sellinger et al. |

FOREIGN PATENT DOCUMENTS

| | | | | |
|---|---|---|---|---|
| FR | 2562834 A1 | | 10/1985 | |
| GB | 2 403 987 A | | 1/2005 | |
| JP | 2015086749 | * | 5/2015 | ............... F01D 5/30 |
| WO | WO03/055339 A2 | | 7/2003 | |
| WO | 2012/065155 A1 | | 5/2012 | |
| WO | 2015/066528 A1 | | 5/2015 | |
| WO | WO2015/066528 A1 | | 5/2015 | |
| WO | WO2015/094421 A1 | | 6/2015 | |
| WO | WO2018/009419 A1 | | 1/2018 | |

OTHER PUBLICATIONS

International Search Report and Written Opinion issued in connection with corresponding PCT Application No. PCT/US2017/40956 dated Mar. 27, 2018.

* cited by examiner

NON-NEWTONIAN MATERIALS IN AIRCRAFT ENGINE AIRFOILS

FIELD OF THE INVENTION

The present subject matter relates generally to gas turbine engine airfoils. More particularly, the present subject matter relates to non-Newtonian materials integrated into gas turbine engine airfoils, particularly fan blades.

BACKGROUND OF THE INVENTION

Fan blades used in jet engine applications are susceptible to foreign object impact damage such as bird ingestion events. Blades made of graphite fiber reinforced composite material are attractive due to their high overall specific strength and stiffness. However, graphite composites are particularly prone to brittle fracture and delamination during foreign object impacts due to their low ductility. Blade leading edges, trailing edges, and tips are particularly sensitive because of the generally lower thickness in these areas and the well-known susceptibility of laminated composites to free edge delamination. In addition blade geometry and high rotational speeds relative to aircraft speeds cause ingested objects to strike the blade near the leading edge. The material near the suction and pressure surfaces of the composite are most prone to fracture due to the local bending deformations typically associated with such events.

Metallic guards bonded to the composite blade are known to provide impact damage protection. However, the high density of these materials limit their use. In addition, blades can be ruggedized by increasing the airfoil thickness either locally or over a wide area. Blade thickening results in an aerodynamic penalty as well as a weight penalty.

Therefore, there exists a need for gas turbine engine components, particularly for fan blades, that may maintain or improve structural performance, including vibratory response, noise, and weight reduction, while mitigating or eliminating challenges or compromises to improved engine performance and operability.

BRIEF DESCRIPTION OF THE INVENTION

Aspects and advantages of the invention will be set forth in part in the following description, or may be obvious from the description, or may be learned through practice of the invention.

A component for a turbine engine is generally provided. In one embodiment, the component includes an airfoil defining a surface, and an energy absorbing composite positioned on the surface of the airfoil or within the airfoil. The energy absorbing composite includes a shear thickening fluid distributed through a matrix.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
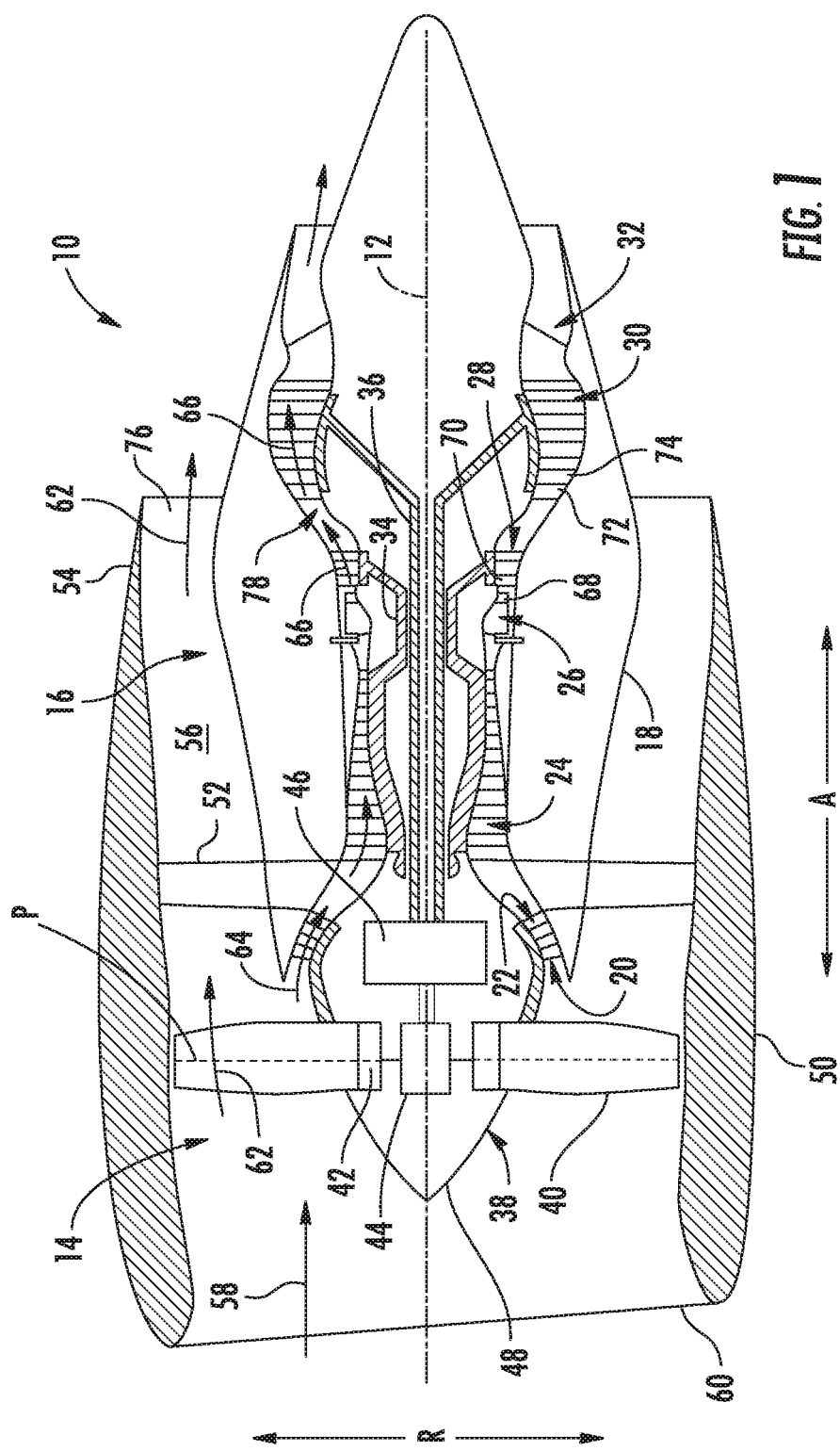
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

An airfoil (e.g., a fanblade) of a gas turbine engine is generally provided with non-Newtonian materials integrated therein and/or thereon. The non-Newtonian material may maintain a desired structural performance and vibratory response while not adversely impacting engine weight, fuel burn, performance, and operability, and as such may produce technical advantages over existing airfoil constructions by reducing limitations and compromises between structural requirements and aerodynamic ideals. For example, interleaved layers, surfacing materials, or foam cores may produce enhanced vibration isolation or self-adjusting mechanical responses following changes in engine operating conditions, as well as impact resistance. Changes in engine operating conditions may arise following degradation over time in revenue service or degradation specifically attributed to operation under certain environmental conditions (e.g. deserts, high-altitude take off, high airborne salinity) or following an engine incident (e.g. bird ingestion, fan blade-out, hail ingestion, ice slab ingestion, compressor surge or stall).

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14. Although described below with reference to a turbofan engine 10, the present disclosure is applicable to turbomachinery in general, including turbojet, turboprop and turboshaft gas turbine engines, including industrial and marine gas turbine engines and auxiliary power units.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across an optional power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Figure 2:
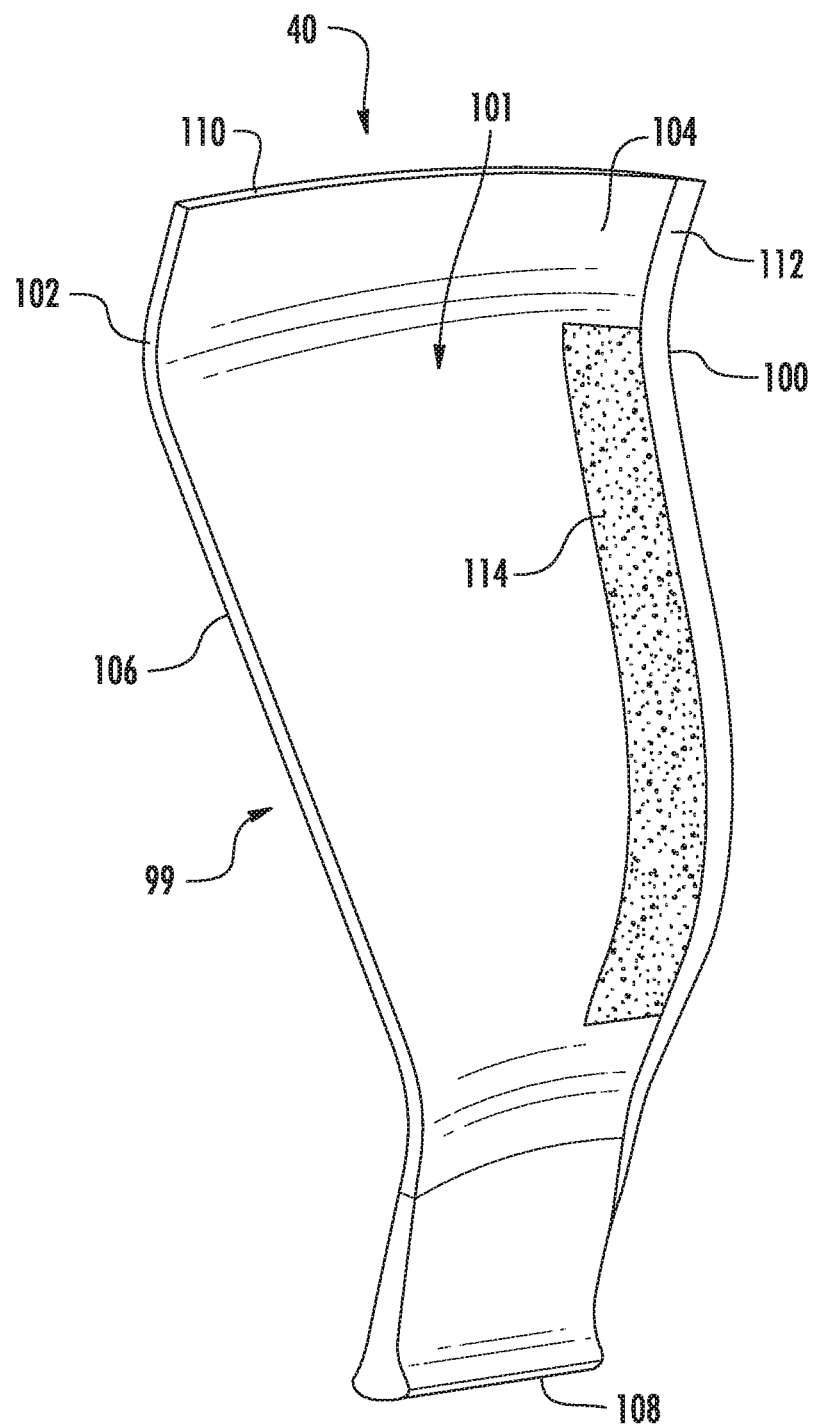
FIG. 2 is a perspective view of an exemplary fan blade having an energy absorbing composite positioned on a surface of its airfoil according to one embodiment.

FIG. 2 shows a perspective view of one embodiment of an exemplary fan blade 40 for use in the engine of FIG. 1. The fan blade 40 has a leading edge 100 and a trailing edge 102. The fan blade also has a first side 104 and a second side 106 that extend between the leading edge 100 to the trailing edge 102. Additional components such as guards or coatings may be applied to the first and second sides 104 and 106. In the embodiment shown, the majority of fan blade 40 is made from fiber composite layers (e.g., carbon fiber layers) extending between the leading edge 100 and the trailing edge 102. The fiber composite layers extend chordwise from leading edge 100 to trailing edge 102 and spanwise from a root 108 to a tip 110. Also shown in FIG. 2, fan blade 10 includes a reinforcement 112 which is a metal guard secured to the leading edge 100. It understood that the reinforcement 112 may be positioned at one or more of the leading edge 100, trailing edge 102, and tip 110 and may be made from materials other than metal.

Figure 3:
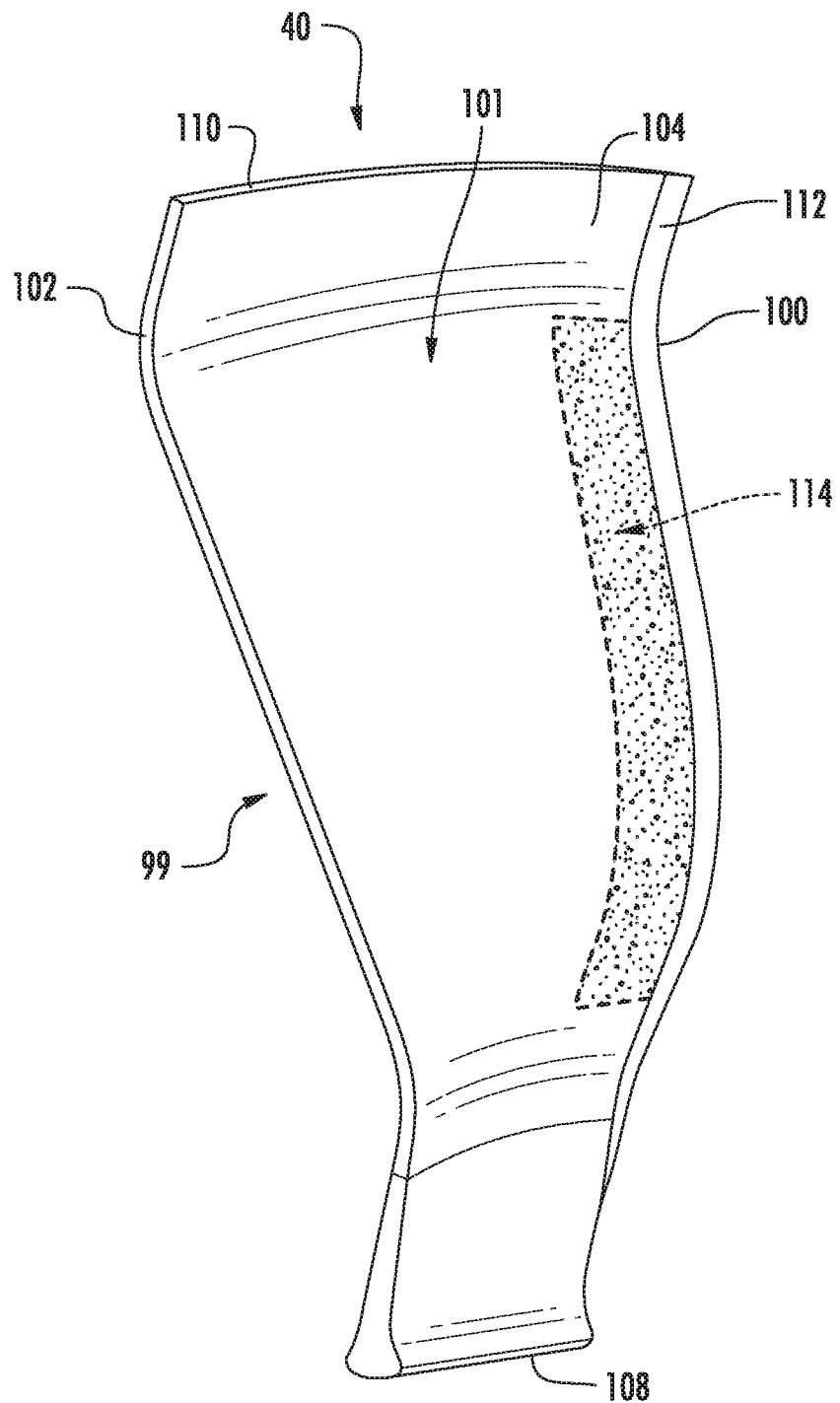
FIG. 3 is a perspective view of another exemplary fan blade having an energy absorbing composite positioned within the surface of its airfoil according to one embodiment.

An energy absorbing composite 114 is shown in the embodiment of FIG. 2 positioned on a surface 101 of the airfoil 40. In the alternative embodiment of FIG. 3, an airfoil 40 is shown with an energy absorbing composite 114 positioned within a surface 101 of the airfoil 40 (i.e., within the construction of the airfoil, such as within the first side 104 as shown in FIG. 3). It is to be understood that fan blade orientations and constructions, other than those shown in FIGS. 2 and 3, are encompassed with the present subject matter.

Figure 4:
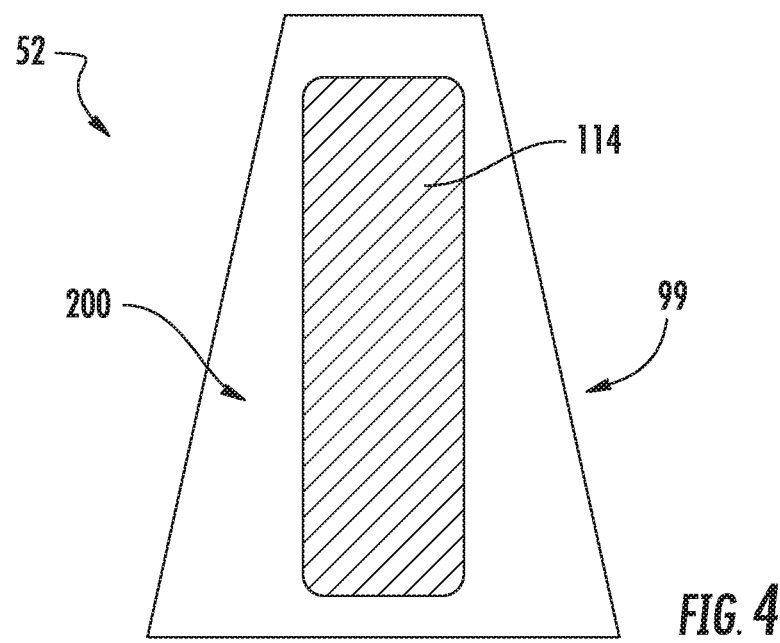
FIG. 4 is a side view of an exemplary outlet guide vane having an energy absorbing composite positioned on a surface of its airfoil according to one embodiment.
Figure 5:
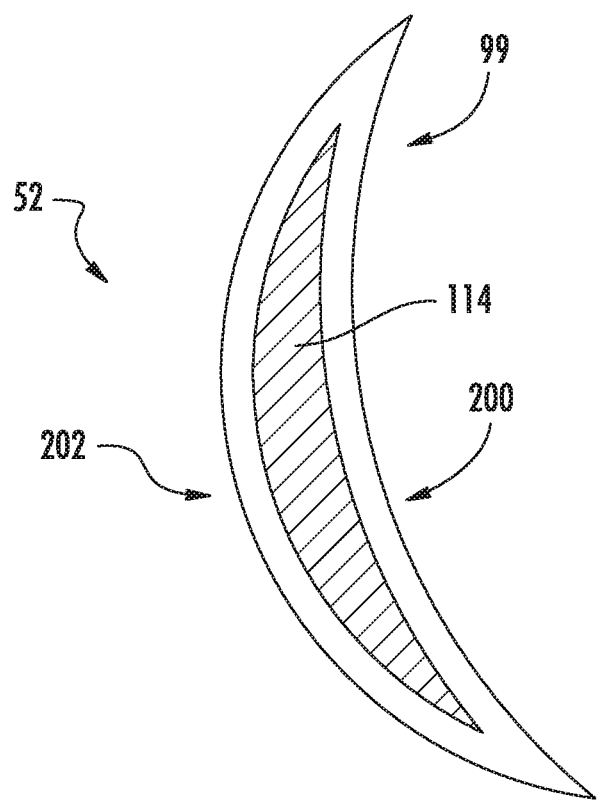
FIG. 5 is a cross-sectional view of another exemplary outlet guide vane having an energy absorbing composite positioned within the surface of its airfoil according to one embodiment.

FIG. 4 shows a side view of an exemplary outlet guide vane 52 including an energy absorbing composite 114 on a side surface 200, which can be particularly suitable for damping. FIG. 5 shows a cross-sectional view of another exemplary outlet guide vane 52 including an energy absorbing composite 114 within its construction between side surfaces 200, 202. As such, each of the fan blades 40 and the outlet guide vanes 52 include an airfoil 99 having an energy absorbing composite 114 on or within its respective surface.

In one embodiment, the energy absorbing composite 114 is a non-Newtonian material that may produce enhanced vibratory isolation, provide self-adjusting mechanical responses, or impact resistance following an engine incident or degrading operating conditions. As such, the energy absorbing composite 114 may serve to mitigate adverse effects of engine performance degradation over time and damage from engine incidents, including damage from domestic object debris (DOD) or foreign object debris (FOD). These benefits may also prevent additional gas turbine engine deterioration by dampening excessive vibrations and reducing or eliminating undesired vibratory modes through the enhanced vibration isolation and self-adjusting properties of the non-Newtonian materials in engine component composite structures.

In one embodiment, the energy absorbing composite 114 includes a shear thickening fluid distributed through a matrix. A non-Newtonian material that exhibits time-independent viscosity is referred to as shear-thickening, as in, the apparent viscosity of the material increases in response to an increase in stress. This behavior may be particularly desirable when designing an airfoil to withstand sudden impacts.

As stated, the energy absorbing composite 114 be applied onto the exterior surface 101 of the fan blade 40, or may be incorporated within the construction of the fan blade 40. When applied to the surface 101, the energy absorbing composite 114 can be attached in several ways including any combination of the following: mechanical fastening of energy absorbing composite 114 to the surface 101, adhesive bonding of the energy absorbing composite 114 to the fan blade 40, etc.

Figure 6:
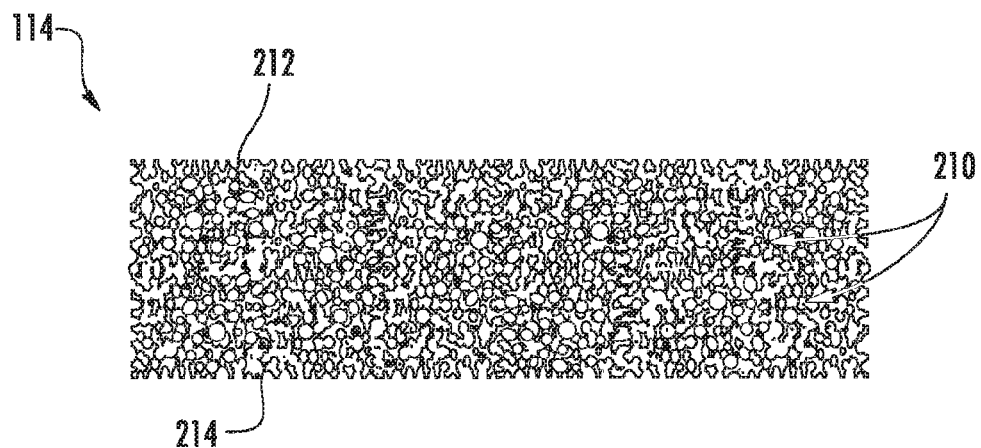
FIG. 6 is a cross-sectional side view of an exemplary energy absorbing composite having a shear thickening fluid distributed throughout a matrix based on a solid foamed synthetic polymer, according to one embodiment.

FIG. 6 shows an exemplary energy absorbing composite 114 having a shear thickening fluid 210 distributed throughout a matrix 212 formed from a solid foamed synthetic polymer 214. In one embodiment, the solid foamed synthetic polymer 214 may include a synthetic elastomer, such as an elastomeric polyurethane. In one particular embodiment, the solid foamed synthetic polymer 214 may include a combination of at least two different synthetic elastomers, such as a first polymer-based elastic material and a second polymer-based elastic material. For example, the first polymer-based elastic material may be an ethylene vinyl acetate and/or an olefin polymer, and the second polymer-based elastic material may be a silicone polymer having dilatant properties (e.g., a borated silicone polymer).

Figure 7:
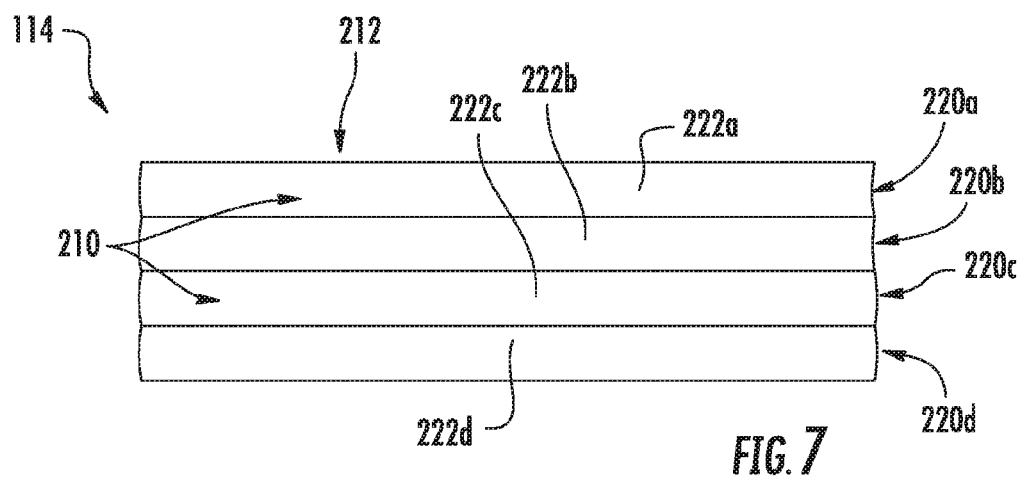
FIG. 7 is a cross-sectional side view of another exemplary energy absorbing composite having a shear thickening fluid distributed throughout a matrix based on a plurality of fibrous sheets, according to one embodiment.

Alternatively, FIG. 7 shows shear thickening fluid 210 distributed throughout matrix 212 including a plurality of fabric sheets 220a, 220b, 220c, 220d formed from a plurality of fibers 222a, 222b, 222c, 222d, respectively. In each sheet, the plurality of fibers 222a, 222b, 222c, 222d may form a network (e.g., a woven network, a nonwoven network (e.g., randomly or parallel), or another orientation). In particular, the energy absorbing composite 114 may be constructed from high strength and high modulus fibers, such as para-aramid synthetic fibers (i.e., KEVLAR fibers available from E.I. duPont de Nemours and Company), metal fibers, ceramic fibers, glass fibers, carbon fibers, boron fibers, p-phenylenetherephtalamide fibers, aromatic polyamide fibers, silicon carbide fibers, graphite fibers, nylon fibers, or mixtures thereof. Another example of suitable fibers includes ultra high molecular weight polyethylene, such as SPECTRA fibers manufactured by Honeywell International Inc.

The fibers of the energy absorbing composite 114 may have high tensile strength and high modulus that are highly oriented, thereby resulting in very smooth fiber surfaces exhibiting a low coefficient of friction. Such fibers, when formed into a fabric layer, generally exhibit poor energy transfer to neighboring fibers during an impact event. Unless addressed, this lack of energy transfer may correlate to a reduced efficiency in dissipating the kinetic energy of a moving object, thereby necessitating the use of more material to achieve full dissipation.

Accordingly, in one particular embodiment, the matrix 212 of the energy absorbing composite 114 is impregnated with a shear thickening fluid 210 to improve the impact resistance of the energy absorbing composite 114. In one exemplary embodiment, the entire energy absorbing composite 114 is impregnated with the shear thickening fluid throughout the entire thicknesses. However, in other embodiments, only a portion of the energy absorbing composite 114 is impregnated with the shear thickening fluid. For example, the innermost fabric sheet 220d adjacent to the surface of the airfoil may be impregnated with the shear thickening fluid, and/or the outermost fabric sheet 220a opposite of the surface of the airfoil may be impregnated with the shear thickening fluid.

In general, the shear thickening fluid is non-Newtonian, dilatant, and flowable liquid containing particles suspended in a carrier whose viscosity increases with the deformation rate. These characteristics increase the energy transfer between the fibers within the energy absorbing composite 114 as the rate of deformation increases. Such energy transfer may be embodied as strain, strain rate, vibration, both frequency and magnitude dependent, pressure, energy (i.e. low force over large distance and high force over short distance both induce a response) as well as energy transfer rate (higher rates induce greater response). As such, at low deformation rates, the energy absorbing composite 114 with the shear thickening fluid may deform as desired for handling and installation. However, at high deformation rates, such as during an impact or damage event, the energy absorbing composite 114 with the shear thickening fluids transition to more viscous, in some cases rigid, materials with enhanced protective properties. Accordingly, the energy absorbing composite 114 impregnated with the shear thickening fluid(s) advantageously provides a structure that is workable, light and flexible during installation, but that is rigid and protective during impact.

As noted above, the shear thickening fluid 210 generally includes particles suspended in a solvent. Any suitable concentration may be provided, and in one example, the shear thickening fluid includes at least about 50 percent by weight particles. Exemplary particles may include fumed silica, kaolin clay, calcium carbonate, and titanium dioxide, and exemplary solvents include water and ethylene glycol. The particles of the shear thickening fluid may be any suitable size to impregnate between the fibers of the energy absorbing composite 114. For example, the particles may be nanoparticles, having an average diameter ranging from about 1 to about 1000 nanometers, or microparticles, having an average diameter ranging from about 1 to about 1000 microns.

Further examples of the particles of the shear thickening fluid include polymers, such as polystyrene or polymethylmethacrylate, or other polymers from emulsion polymerization. The particles may be stabilized in solution or dispersed by charge, Brownian motion, adsorbed. Particle shapes may include spherical particles, elliptical particles, or disk-like particles.

The solvents are, in one embodiment, generally aqueous in nature (i.e. water with or without added salts, such as sodium chloride, and buffers to control pH) for electrostatically stabilized or polymer stabilized particles. In other embodiment, the solvents may be organic (such as ethylene glycol, polypropylene glycol, glycerol, polyethylene glycol, ethanol) or silicon based (such as silicon oils, phenyltrimethicone). The solvents can also be composed of compatible mixtures of solvents, and may contain free surfactants, polymers, and oligomers. The solvent of the shear thickening fluid is generally stable so as to remain integral to the energy absorbing composite 114. For a general preparation, the solvent, particles, and, optionally, a setting or binding agent are mixed and any air bubbles are removed.

The shear thickening fluid may be embedded into the energy absorbing composite 114 in a number of ways. For example, the shear thickening fluid may be applied by coating the energy absorbing composite 114 with techniques such as knife-over-roller, dip, reverse roller screen coaters, application and scraping, spraying, and full immersion. The energy absorbing composite 114 may undergo further operations, such as reaction/fixing (i.e. binding chemicals to the substrate), washing (i.e. removing excess chemicals and auxiliary chemicals), stabilizing, and drying. For example, the fibers of the energy absorbing composite 114 may be bound with the shear thickening fluid with a thermosetting resin that may be cured with ultraviolet (UV) or infrared (IR) radiation. Generally, such curing will not result in the hardening of the energy absorbing composite 114 and the shear thickening fluid, such that the energy absorbing composite 114 remain workable until installation. Additional coatings may be provided, such as to make the energy absorbing composite 114 fireproof or flameproof, water-repellent, oil repellent, non-creasing, shrink-proof, rot-proof, non-sliding, fold-retaining, antistatic, or the like.

The energy absorbing composite 114 may be impregnated with the shear thickening fluid prior to installation, for example, as a prepreg in which the impregnated with shear thickening fluid packaged and sold as a roll of continuous material. A length of the energy absorbing composite 114 may be sized, cut and installed, and as many layers as desired may follow. Because the shear thickening fluid is flowable and deformable, it can fill complex volumes and accommodate bending and rotation.

In certain embodiments, the shear thickening fluid includes a dilatant, which possesses non-Newtonian properties in which the viscosity of the fluid increases with an increase in the rate of shear strain. A dilatant generally includes particles disbursed within a fluid (e.g., a liquid or a gas). Under one theory of shear thickening behavior, particles within a dilatant are in a state of equilibrium. So long as a critical shear rate is not exceeded, the particles will maintain an ordered equilibrium as a shear force is applied to the fluid. In other words, particles in a shear-thickening fluid will maintain Newtonian flow properties (e.g. act as a liquid), as long as the rate of an applied force does not exceed a certain threshold (i.e. the critical shear rate). However, if a dilatant experiences a shear rate greater than its critical shear rate, particles within the fluid will no longer be held in an ordered, equilibrium state, and will instead behave as a solid. This behavior is generally appreciable where large, sudden, momentary forces (e.g. object strikes, impacts, pressure oscillations, or sudden changes in acceleration) may be applied to an engine component incorporating a dilatant-impregnated matrix. With generally low profiles and high flexibility, an engine component incorporating a dilatant may additionally benefit from increased shock absorption while minimizing deleterious side-effects, such as increased engine component weight or larger profiles.

The particles contained in the dilatant may vary in size, shape, and material to suit the requirements of an engine component. Without wishing to be bound by any particular theory, it is believed that as dilatant fluid behavior is highly dependent upon the volume fraction of particles suspended within the fluid, the size or overall volume of particles influences the amount of shear required to initiate shear-thickening behavior. For gas turbine engine components, polymer particles, fumed silica, kaolin clay, calcium carbonate, titanium dioxide, or mixtures thereof with an average diameter of about 1 nm to about 1000 μm in a flowable liquid suspended in a fluid may exhibit the desired behavior for engine components such as airfoils, casings, or structural members.

The foregoing has described an engine component including a shear thickening fluid and/or dilatant distributed on or within the engine component for a gas turbine engine through a matrix. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A component for a turbine engine, the component comprising:
    an airfoil defining a surface; and
    an energy absorbing composite positioned on the surface of the airfoil or within the airfoil, wherein the energy absorbing composite includes a shear thickening liquid distributed through a matrix, wherein the shear thickening liquid comprises a polymer-based dilatant and particles suspended therein, and wherein the particles have an average diameter of about 1 nm to about 1000 μm.

2. The component as in claim 1, wherein the energy absorbing composite is positioned within the construction of the airfoil.

3. The component as in claim 1, wherein the energy absorbing composite is positioned on at least a portion of the surface of the airfoil.

4. The component as in claim 3, wherein the energy absorbing composite is positioned on a leading edge of the airfoil, a side surface of the airfoil, or both.

5. The component as in claim 1, wherein the matrix comprises a solid foamed synthetic polymer matrix.

6. The component as in claim 5, wherein the solid foamed synthetic polymer matrix comprises a synthetic elastomer.

7. The component as in claim 6, wherein the synthetic elastomer comprises an elastomeric polyurethane.

8. The component as in claim 6, wherein the synthetic elastomer comprises a first polymer-based elastic material and a second polymer-based elastic material.

9. The component as in claim 8, wherein the first polymer-based elastic material comprises an ethylene vinyl acetate or an olefin polymer, and wherein the second polymer-based elastic material comprises a silicone polymer having dilatant properties.

10. The component as in claim 1, wherein the polymer-based dilatant comprises a silicone polymer having dilatant properties.

11. The component as in claim 1, wherein the polymer-based dilatant comprises a borated silicone polymer.

12. The component as in claim 1, wherein the matrix comprises a plurality of fabric sheets, each fabric sheet comprising a network of fibers.

13. The component as in claim 12, wherein the fibers comprise para-aramid synthetic fibers, ultra-high molecular weight polyethylene, metal fibers, ceramic fibers, glass fibers, carbon fibers, boron fibers, p-phenyleneterephtalamide fibers, aromatic polyamide fibers, silicon carbide fibers, graphite fibers, nylon fibers, or mixtures thereof.

14. The component as in claim 12, wherein the plurality of fabric sheets includes an innermost fabric sheet adjacent to the surface of the airfoil, and wherein the innermost fabric sheet comprises the network of fibers impregnated with the shear thickening liquid.

15. The component as in claim 12, wherein the plurality of fabric sheets includes an exposed, outermost fabric sheet opposite of the surface of the airfoil, and wherein the exposed, outermost fabric sheet comprises the network of fibers impregnated with the shear thickening liquid.

16. The component as in claim 1, wherein the particles comprise polymer particles, fumed silica, kaolin clay, calcium carbonate, titanium dioxide, or mixtures thereof.

17. A gas turbine engine, comprising the component as in claim 1.

* * * * *